US010697907B2

United States Patent
Reinis et al.

(10) Patent No.: US 10,697,907 B2
(45) Date of Patent: Jun. 30, 2020

(54) METROLOGY MEASURING APPARATUS

(71) Applicant: XWINSYS LTD., Migdal Haemek (IL)

(72) Inventors: Doron Reinis, Givat Ela (IL); Michael Geffen, Gilon (IL); Roni Peretz, Haifa (IL); Colin Smith, Amikam (IL)

(73) Assignee: XWINSYS LTD., Migdal Haemek (IL)

( * ) Notice: Subject to any disclaimer, the term of this patent is extended or adjusted under 35 U.S.C. 154(b) by 203 days.

(21) Appl. No.: 15/574,171

(22) PCT Filed: May 29, 2016

(86) PCT No.: PCT/IL2016/050554
§ 371 (c)(1),
(2) Date: Nov. 15, 2017

(87) PCT Pub. No.: WO2016/193967
PCT Pub. Date: Dec. 8, 2016

(65) Prior Publication Data
US 2018/0128756 A1    May 10, 2018

Related U.S. Application Data

(60) Provisional application No. 62/169,015, filed on Jun. 1, 2015.

(51) Int. Cl.
*G01N 23/223* (2006.01)
*G02B 21/00* (2006.01)

(52) U.S. Cl.
CPC ....... *G01N 23/223* (2013.01); *G02B 21/0024* (2013.01); *G01N 2223/076* (2013.01); *G01N 2223/6116* (2013.01)

(58) Field of Classification Search
None
See application file for complete search history.

(56) References Cited

U.S. PATENT DOCUMENTS

| 2006/0262900 A1 | 11/2006 | Sipila et al. |
| 2011/0079734 A1 | 4/2011 | Grodzins et al. |
| 2014/0286473 A1* | 9/2014 | Tokar .................. G01N 23/223 378/43 |

\* cited by examiner

*Primary Examiner* — Hoon K Song
(74) *Attorney, Agent, or Firm* — Law Offices of Steven W. Weinrieb

(57) ABSTRACT

The present disclosure provides a method and an apparatus for apparatus for accurately measuring and calibrating elemental concentration measurements for a semiconductor wafer. The apparatus includes an edxrf system for calculating an elemental concentration at a target area of the semiconductor wafer. The apparatus further includes an optical subsystem for calculating volumetric information of the target area of the semiconductor wafer. The elemental concentration may be calibrated by first correlating the elemental concentration measurements for a norm feature at the target area with the volumetric information for the norm feature of the target area to obtain a calibration data. Thereafter, the calibration data obtained is used to calibrate the elemental concentration measurements to achieve an accurate measurement thereof.

15 Claims, 6 Drawing Sheets

METHOD 500      FIG. 5

METROLOGY MEASURING APPARATUS

RELATED APPLICATIONS

The present patent application claims priority to the previously filed and provisional patent application Ser. 62/169,015 filed on Jun. 1, 2015.

TECHNICAL FIELD

The present disclosure generally relates to a metrology apparatus for a semiconductor wafer; and more particularly relates to a metrology apparatus for accurately measuring and calibrating elemental concentration of a semiconductor wafer.

BACKGROUND

The presence of contaminant particles on the surface of electronic substrates such as a semiconductor wafers, may lead to formation of defects during the microelectronics fabrication process. In order to maintain high manufacturing yield and thus low manufacturing costs, it is necessary that contaminated wafers be identified and cleaned during the manufacturing process. Further, the inspection of excursions and/or defects in the semiconductor wafers may also be used to detect any defects and/or quality issues within the wafer manufacturing processes.

ED-XRF is a reliable, sensitive and widely used technique for the detection and quantification of elemental concentrations within a sample material under investigation. Such a technique involves irradiating a surface of the sample material with a high energy beam, such as X-rays, from a source such as an X-ray tube and observing the resulting fluorescence emitted by the irradiated area through a radiation detector. The detector collects the emitted radiations and produces signals representative of the energies of received x-rays. Since each element has a different and identifiable X-ray fluorescence signature, an operator can determine the presence and concentration of the element(s) within the sample by measuring the wavelengths and intensity of the emitted radiation as well known in the art.

Generally, the ED-XRF technique provides a relative measurement and in order to arrive at a quantifiably correct concentration, a calibration method must be applied. Numerous efforts have been made to achieve an accurate calibration of the elemental concentration measurement within a sample semiconductor material.

In one such solution, known as reference standard for calibration, the sample material is pre-calibrated using reference samples of known quality having properties similar to the sample material being investigated. However, Since the ED-XRF measurements are sensitive to many factors, such as for example, chemical concentration of elements, the physical properties of samples, the influence of other elements present in the sample (also known as the inter-element effects) etc., the reference sample preparation is generally a time-consuming, expensive, and inconvenient process.

In another solution, known as Fundamental Parameters method for calibration, incorporates instrument parameters in the calibration equations using mathematical formulation of the elemental physical processes. While, such a method significantly reduces the effort for calibrating the measurements of xrf by theoretically yielding the composition and concentration of the elements present in the sample, the method is not considered accurate practically as it has limitations such as for example it assumes time invariance of the measurement system.

Further, with recent advancements, most of the semiconductor wafers are three dimensional structures having varying heights and thicknesses. The ED-XRF measuring system, in general, however, is not subtle enough to accurately measure the thickness etc. of the sample material to be investigated, as the emitted radiations from such sample materials will have different signal strength for different height areas. Accordingly, the signal representing the area having higher thickness may get saturated and the areas having very low height may suffer loss of sensitivity thereby not allowing the detector to measure an accurate elemental composition. Consequently, the elemental composition of material of different thickness cannot be appropriately differentiated by the XRF system alone.

Therefore, there is a need in art for a simple and accurate system that not only measures the three dimensional structure but also accurately calibrate the elemental composition of the material to be investigated.

SUMMARY

In one aspect of the present disclosure, a metrology apparatus for accurately measuring and calibrating elemental concentration of a semiconductor wafer by a combined application of edxrf technology and optical confocal microscopy is disclosed. The apparatus includes an edxrf subsystem configured to identify elements and the concentration of elements present within a target area of the semiconductor wafer. The apparatus further includes an optical subsystem having at least a confocal microscope unit and an optical unit adapted to accurately measure geometrical parameters such as critical dimensions, volume, thickness, depth etc. of the target area of the sample material. The apparatus furthermore includes a controller configured to receive measurements from the edxrf subsystem, and from the optical subsystem. The controller includes a processing unit configured to calibrate the elemental concentration within the target area of the semiconductor wafer by processing the measurements received from the optical subsystem and the edxrf subsystem.

Further, the apparatus includes an optical microscope unit as a targeting unit for spotting the target area to be analyzed by the edxrf subsystem as well as the optical subsystem.

Generally, the edxrf subsystem includes an x-ray source for irradiating the target area of the semiconductor wafer with a primary beam.

Further, the edxrf subsystem includes an X-ray detector for receiving fluorescence beam emitted from the target area.

Furthermore, the X-ray detector of the edxrf subsystem may detect the photon count and elemental concentration of the emitted fluorescence beams.

Optionally, the edxrf subsystem further includes an X-ray optic for directing and shaping the x-ray source's beam onto the target area of the semiconductor wafer.

Further optionally, the edxrf subsystem may include an xrf detector controller for processing the fluorescence beam detected by the xrf detector.

Potentially, the optical subsystem includes a confocal optical microscope for capturing a 3-dimensional image of the target area.

Further potentially, the optical subsystem may include an optical controller for processing the 3-dimensional image to detect the geometric parameters such as volume, depth, and critical dimensions of the target area of the semiconductor wafer.

Additionally, the apparatus may include a display unit for displaying the accurately measured and calibrated elemental concentration information in the form of graphs, tables, etc.

In another aspect of the invention, the disclosure provides a method for accurately measuring and calibrating elemental concentration measurement using the apparatus of the current disclosure. The method includes calculating an elemental concentration at a target area of the semiconductor wafer using an edxrf subsystem. The method further includes calculating volumetric information of the target area of the semiconductor wafer using an optical subsystem. The method further includes correlating the elemental concentration measurements for a norm feature at the target area with the volumetric information for the norm feature of the target area to obtain a calibration data. Further, the method includes calibrating the elemental concentration measurement for the target area using the obtained calibration data and the volumetric information received from the optical subsystem.

Potentially, the elemental concentration of the norm feature is converted to a relative volumetric information before correlation with the volumetric information received from optical subsystem.

Further potentially, the correlation is done by generating a plot between the relative volumetric information and the volumetric measurement using a correlation algorithm.

Yet further potentially, the correlation algorithm used is Pearson correlation algorithm.

Potentially, the obtained calibration data is an elemental contrast as a function of volumetric disparity between the relative volumetric information and the volumetric measurement received from the optical subsystem.

Possibly, the calibration is done by generating a reference table to calibrate the elemental concentration measurements.

Further possibly, the calibration is done by plotting a graph between the elemental concentration and the volumetric information received from the optical subsystem.

The details of one or more implementations are set forth in the accompanying drawings and the description below. Other aspects, features and advantages of the subject matter disclosed herein will be apparent from the description, the drawings, and the claims.

DETAILED DESCRIPTION

As required, a schematic, exemplary-only embodiment of the present application is disclosed herein; however, it is to be understood that the disclosed embodiment is merely exemplary of the present disclosure, which may be embodied in various and/or alternative forms. Specific structural and functional details disclosed herein are not to be interpreted as limiting, but merely as a basis for the claims and as a representative basis for teaching one skilled in the art to variously employ the present disclosure in virtually any appropriately detailed structure.

Aspects, advantages and/or other features of the exemplary embodiment of the disclosure will become apparent in view of the following detailed description, which discloses various non-limiting embodiments of the invention. In describing exemplary embodiments, specific terminology is employed for the sake of clarity. However, the embodiments are not intended to be limited to this specific terminology. It is to be understood that each specific portion includes all technical equivalents that operate in a similar manner to accomplish a similar purpose.

Exemplary embodiments may be adapted for many different purposes and are not intended to be limited to the specific exemplary purposes set forth herein. Those skilled in the art would be able to adapt the exemplary-only embodiment of the present disclosure, depending for example, on the intended use of adapted embodiment. Moreover, examples and limitations related therewith brought herein below are intended to be illustrative and not exclusive. Other limitations of the related art will become apparent to those of skill in the art upon a reading of the following specification and a study of the related figures.

The present application discloses a metrology apparatus for measuring elemental concentration of a semiconductor wafer and further calibrating the measured elemental concentration to yield accurate measurements. The apparatus may generally be used for measuring elemental concentration of any sample semiconductor structure such as but not limited to FinFETs, low-dimensional structures such as nanowires, memory structures such as DRAM, DRAM 4F2, FLASH, MRAM, high aspect ratio memory structures and multilayer metals and/or isolators, three-dimensional structures well known in the art. It is to be understood that while the current disclosure has been explained only for homogeneous surfaces, the apparatus may be used for both homogeneous as well as non-homogeneous surfaces and those skilled in the art may appreciate that the known methods such as correction algorithm based general principles may be applied for measurement of non-homogeneous surfaces. It must also be noted that, as used in this specification and the appended claims, the singular forms "a," "an" and "the" include plural referents unless the context clearly dictates otherwise. Thus, for example, the term "a beam" is intended to mean a single ray or a combination of rays.

Figure 1:
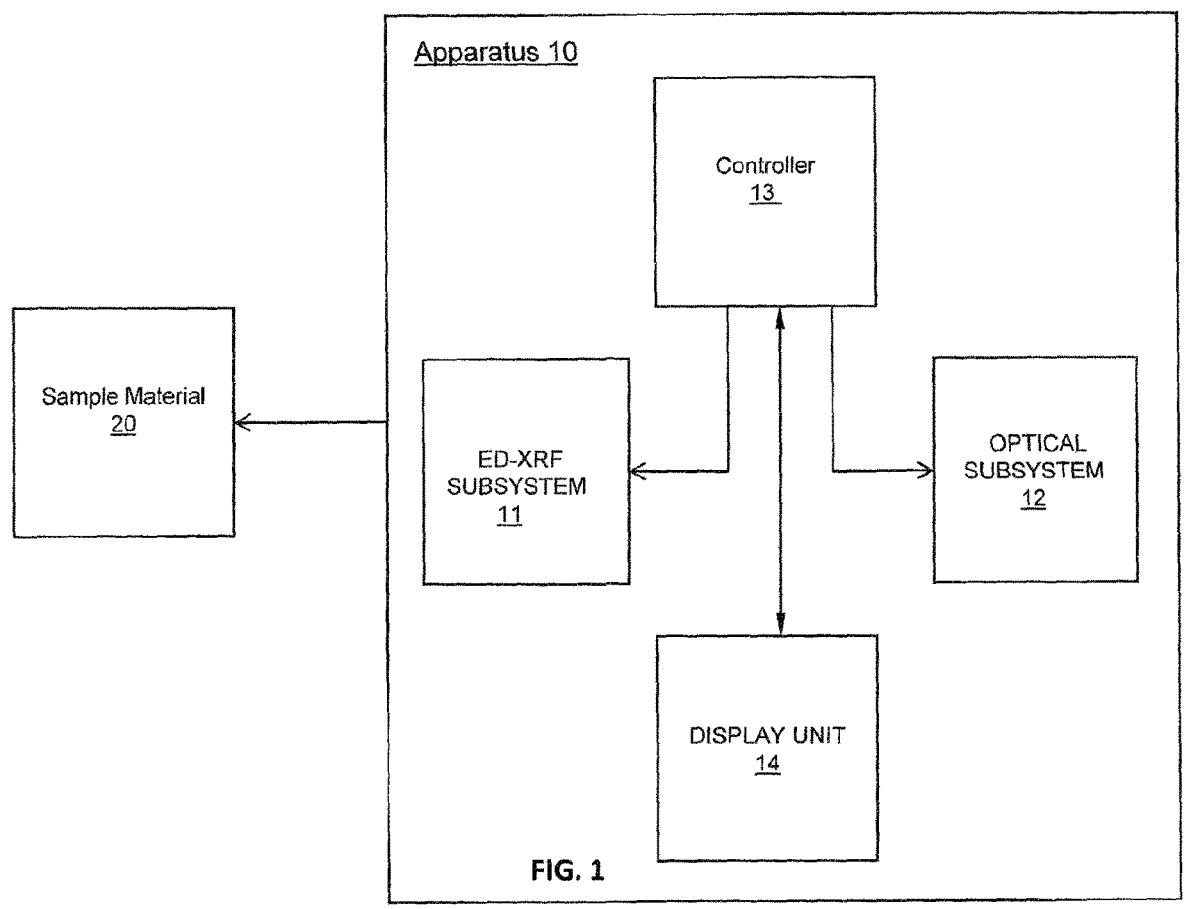
FIG. 1 is a block diagram representing a metrology apparatus, according to one preferred embodiment of the present disclosure.

FIG. 1 depicts a block diagram displaying basic components of the metrology apparatus of the present disclosure. As illustrated in FIG. 1, an apparatus 10 for accurately measuring an elemental composition as well the elemental concentration of each element present within a target area of a semiconductor wafer 20 is disclosed. The apparatus 10 comprises an edxrf subsystem 11 capable of analyzing an xrf spectrum and in turn identify a first measurement data indicative of elemental parameters such as elemental composition, and element concentration at the target area of the semiconductor wafer 20. The apparatus 10 further comprises an optical subsystem 12 for identifying a second measurement data indicative of geometric parameters such as pitch, critical dimension (CD), side wall angle (SWA), line width roughness (LWR), and line edge roughness (LER)) of the target area of the wafer 20. Further; the apparatus includes a controller 13 connected to, and configured to acquire the first measurement data from the edxrf subsystem 11 and the second measurement data from the optical subsystem 12. The controller 13 is further configured to process at least in parts the first measurement data and the second measurement data to accurately measure and calibrate the elemental concentration measurements for the target area of the wafer 20. In some embodiments, the apparatus may further include a display unit 14 operably connected to the controller unit 13 for displaying outputs such as XRF spectrum, elemental composition, and the calibrated elemental concentration.

Figure 2:
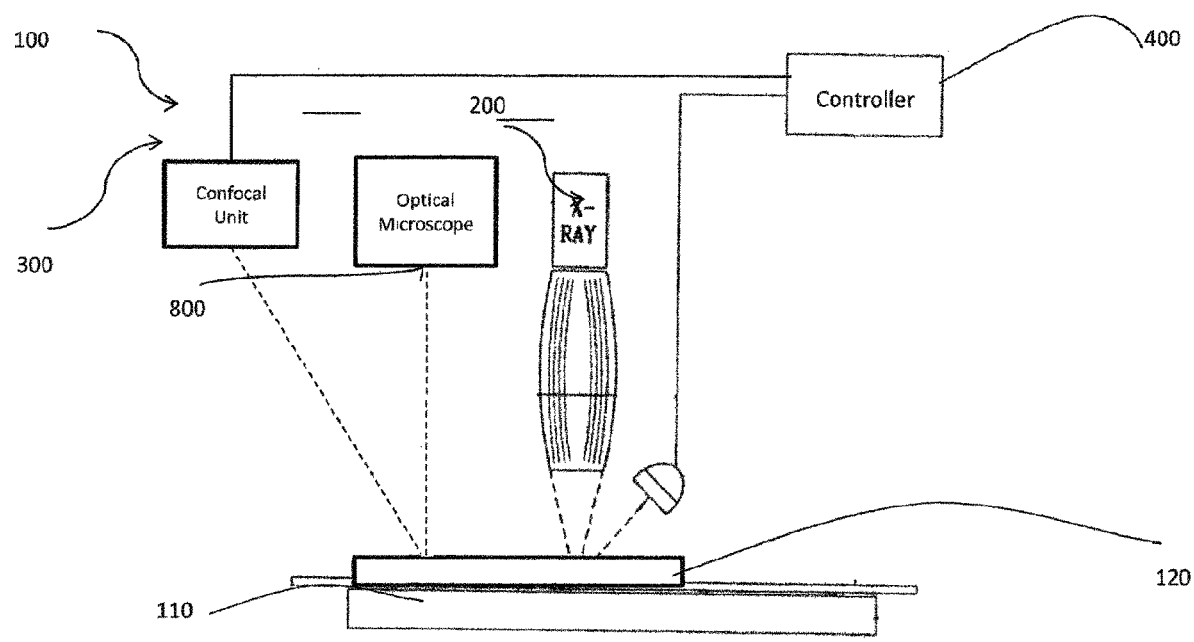
FIG. 2 is a schematic view of the metrology apparatus of FIG. 1, according to one preferred embodiment of the present disclosure.

FIG. 2 schematically show the arrangement of the basic components of the apparatus 10 of the present disclosure. However, in the construction of commercial functional units, secondary components such as wires, leads, couplers, connectors, support structure and other functional components known to one of skill in the field of metrology may be incorporated within the apparatus 10. Such commercial arrangements are included in the present invention as long as the structural components and arrangements disclosed herein are present.

Referring to FIG. 2, a metrology apparatus 100, generally represented by a numeral 100 for measuring an elemental concentration within a generally homogeneous semiconductor wafer 120, is illustrated in accordance with an embodiment of the present disclosure. While the surface of the wafer 120 is homogeneous for exemplary purpose only, it should be understood that the wafer 120 may be of any type, shape and size, including the radius and height suitable according to its intended applications.

As shown in FIG. 2, the metrology apparatus 100 includes a platform 110 for holding the wafer 120. The platform 110 is generally a movable platform, such as an X-Y stage, so as to enable the wafer 120 to be moved with respect to the input beams acting thereon. Alternatively, the platform 110 may be a suitable stationary fixture on which the wafer 120 may be held. The apparatus 100 further comprises an edxrf subsystem 200, and an optical confocal subsystem 300, connected to a controller unit 400. The apparatus 100 may further include an optical microscope 800 as a targeting unit for spotting the target area of the semiconductor wafer 120.

Figure 3:
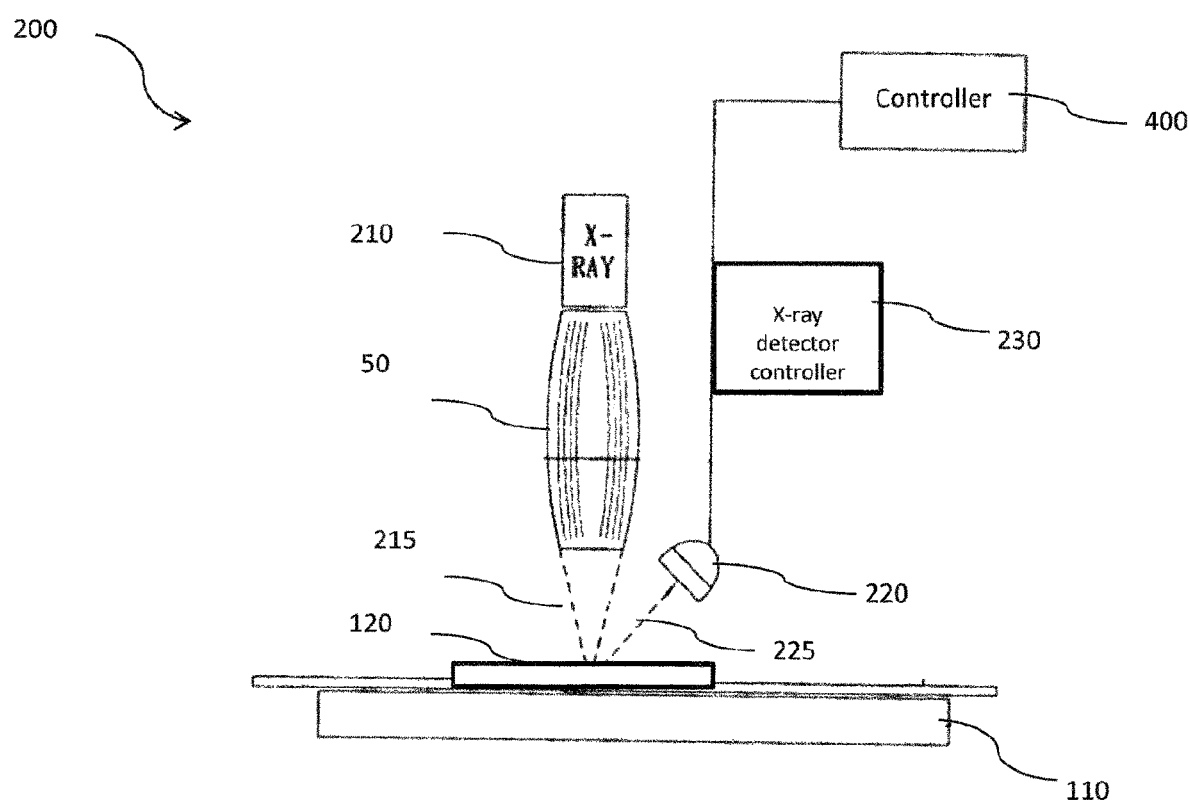
FIG. 3 is a schematic view of the edxrf subsystem, according to an embodiment of the present disclosure.

As illustrated in FIG. 3, the ED-XRF subsystem 200 includes an x-ray source 210 for generating a primary incident beam 215 to enable excitation of atoms at a target area of the wafer 120. The X-ray source 210 may take the form of any suitable x-ray tube or radioisotope source. As used herein, the term "x-ray" is broadly defined to include any radiation having energy suitable for causing fluorescence of the wafer 120 via ejection of an inner shell electron, and may encompass radiation classified as gamma-rays in other contexts. In some embodiments, the edxrf subsystem 200 may further include an X-ray optic 50 to shape and direct the incident x-ray beam 215 onto the target area. The x-ray optic 50 comprises a shaping unit, such as, but not limited to, a poly-capilar unit, one or more x-ray shaping/focusing elements, x-ray apertures, x-ray monochromator, and x-ray beam stops, or any combination thereof to define the geometry of the primary beam 215, incident on the wafer 120. In some other embodiments, a movable collimator (not shown) may be positioned in the path of the primary beam 215 so as to define the geometry thereof.

The edxrf subsystem 200 further includes an X-ray detector 220 positioned to receive secondary beam 225 emitted by the wafer 120. The emitted secondary beam 225 will typically comprise a mixture of fluorescent x-rays characteristic of specific elements present in the wafer 120 and elastically scattered (Rayleigh) and in-elastically scattered (Compton) x-rays. The design and operation of XRF detectors are well known in the art and hence will not be discussed herein. Generally described, the x-ray detector 220 resolves one or more x-ray photon energies from the detected secondary beam 225 and outputs a first measurement data comprising an electric signal for each x-ray energy component indicative of properties of the wafer 120. In some embodiments, the detector 220 may include an xrf detector controller 230 for processing the detected secondary beam 225. The detector 220 is generally an energy-dispersive x-ray spectroscopy (EDS) but in various implementations, the detector 220 may take the form from one of but not limited to a scintillation detector, ccd detector, or any other suitable type of x-ray fluorescence detector known to one skilled in the art.

In some embodiments an additional x-ray optic (not shown) may be positioned in the path of the secondary beam 225 to adjustably control the geometry of the beam conveyed to and sensed by detector 220.

The sizes and positioning of x-ray source 210, x-ray detector 220, and one or more x-ray optics may be varied to produce a desired inspection volume geometries, as required by the application.

Figure 4:
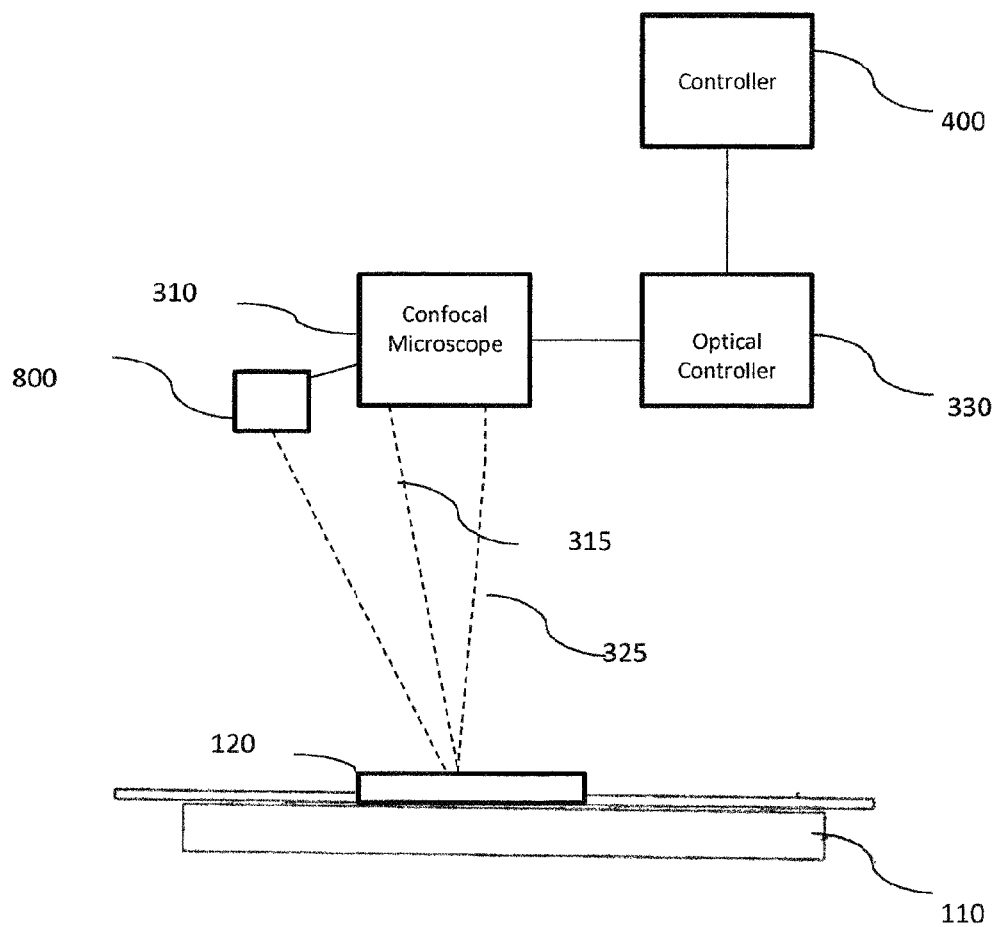
FIG. 4 is a schematic view of the optical subsystem, according to an embodiment of the present disclosure.

FIG. 4 is a symbolic diagram of the components of an optical subsystem 300 adapted to measure the geometrical parameters of the wafer 120. The optical subsystem, 300 includes an optical confocal microscope 310 acting as an illumination source for emitting an input beam 315, generally a white light. The optical subsystem 300 may be adapted to accurately scan an image of the target area. The image may be analyzed by an optical controller 330 to produce a second measurement data comprising geometrical measurements such as volume, critical dimensions, depth, height etc. of the target feature. The design and operation of dual optical confocal microscopy units are well known in the art and hence will not be discussed herein.

In an embodiment of the present invention, the optical microscope 800 spots the target area of the wafer 120 and feeds the spot information to the edxrf subsystem 200 and the optical subsystem 300. Thereafter, the target area may be analyzed sequentially and alternatively using each of the subsystem 200 and 300. The positioning table 110 may be adapted to move to and fro such that the target area of the semiconductor wafer 120 may be positioned at the incidence point of either the x-ray beam of subsystem 200 or the confocal beam of the subsystem 300.

The apparatus 100 of the present disclosure may further include a controller 400 as illustrated in FIG. 2. It may be understood that the controller 400 may be a computing device, including typical components like, a display unit, a central processing unit (CPU), random access memory (RAM), read-only memory (ROM), at least one stored program, display readouts, and at least one input unit. The controller 400 is connected to the edxrf subsystem 200 and the optical subsystem 300 of the apparatus 100. In general, the controller 400 is adapted to receive the first measurement data from edxrf subsystem 200 and the second measurement data from the optical subsystem 300, and to accurately measure and calibrate the elemental concentration based upon the inputs received. Typically, the processing unit of the controller 400 may include program instructions for acquisition and analysis of the measurement data received from the edxrf subsystem 200 and the optical subsystem 300, including implementations of the method steps depicted in FIG. 5 and discussed below.

The display unit is a visible portion of the controller 400. The display unit preferably houses the display readouts, input module, CPU, RAM, and ROM, as well as any programs stored in the RAM or ROM. The display readouts preferably include a display screen such as a crystal display (LCD) panel, or the like to display outputs such as a "XRF Spectra", the "first measurement data", the second measurement data, and calibrated elemental concentration. In some embodiments, the controller may construct an energy spectrum of the calibrated measurements for element-specific estimates of concentrations present in the sample, identifying characteristic peaks 166 of the XRF spectral datasets 152 and may display onto the display unit.

The input module preferably includes a start measurement switch for starting calibration process using the apparatus 100. The input module may further include switches for controlling the operation of the edxrf subsystem 200 and the optical subsystem 300. In an embodiment, the edxrf subsystem 200 and the optical subsystem 300 work simultaneously within the same time frame. In another embodiment, the edxrf subsystem 200 and the optical subsystem 300 work sequentially one after the other.

The CPU, RAM, ROM, and program act in concert to evaluate the inputs received and to control the calibration process. The CPU and RAM may be specially manufactured for this invention, or may preferably make us of off-the-shelf items available at the time of manufacture. The ROM may also be specially designed for this invention and may include program instructions. However, PROMs, EPROMs, EEPROMs or the like are preferred, which allow for selective programming, and may be arranged to be programmed even in the field. The RAM is preferably used to temporarily store operator and system inputs, but may also be used to store programming instructions supplemental to the program or programs stored in the ROM. Based on the programming instructions from the ROM or other memory source and the inputs received, the CPU sends outputs to the display panel, as well as to outputs that control various components of the apparatus 10.

Figure 5:
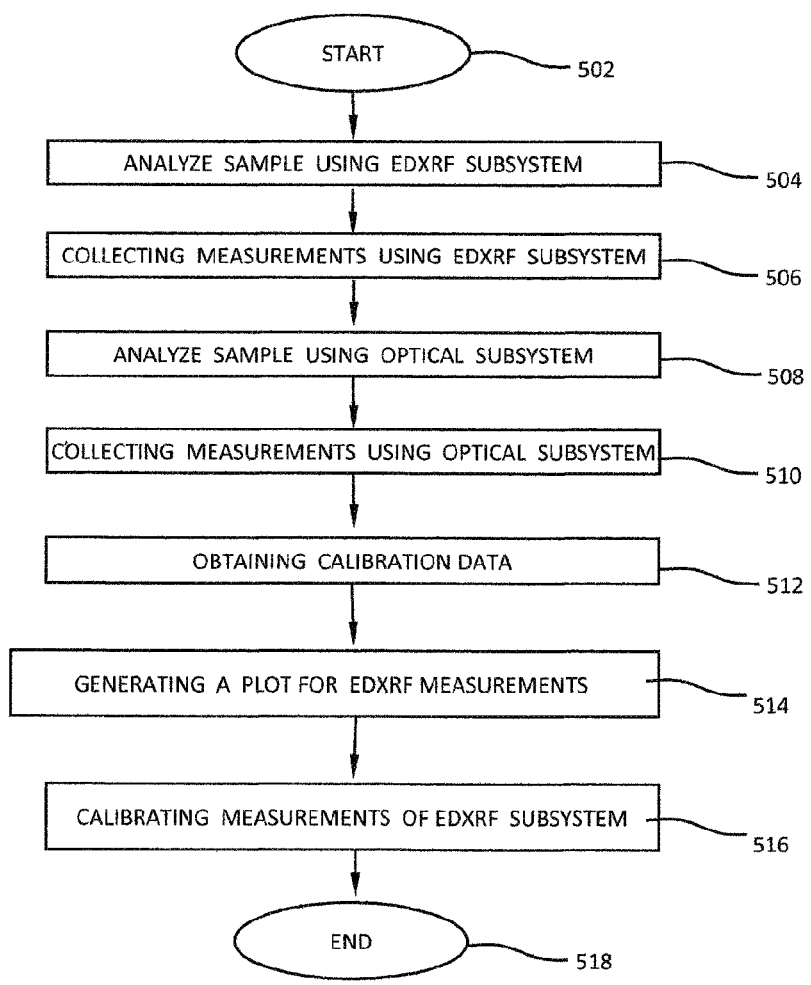
FIG. 5 is a flowchart illustrative of an exemplary method 500 for accurately measuring and calibrating elemental concentration measurements within a target area, according to an embodiment of the present disclosure.

FIG. 5 with reference to FIGS. 1 through 4, represents a flow diagram depicting a method for calibrating a measurement of elemental concentration for of a semiconductor wafer 120 using the apparatus 100. The semiconductor wafer 120 may be any semiconductor structure having shape, size, thickness, depth and features as per the intended application thereof. The target area of the semiconductor wafer may be a feature, element, portion of the semiconductor wafer 120 where the elemental concentration has to be measured. It is to be understood that while the method has been disclosed for a single target area of interest, it may be used to analyze any number of the target area of the semiconductor wafer 120. The semiconductor wafer 120 further comprises a predefined norm feature of known dimensions. The term "norm feature" refers to a feature such as a bump, void, pillar present on a semiconductor wafer; having known dimensions and may be measured accurately using 3-dimensional imaging methods such as a dual confocal microscopy imaging methodology. Alternatively, the semiconductor wafer 120 may comprise a golden feature of known dimensions. The term "golden feature" refers to a feature such as a bump, void, pillar or the like, prepared in the laboratory and used with the semiconductor wafer 120 during calibration of the elemental concentration using apparatus 100 of the present invention.

The method 500 starts at step 502, and proceeds to step 504 where a target area of a semiconductor wafer 120 to be inspected is analyzed using edxrf sub system 200.

As already well known in the art, the x ray source 210 emits a primary x-ray beam 215 towards a target area of the semiconductor wafer 120 thereby producing an excited secondary beam 225 of x-ray fluorescence, which is then collected by the x-ray detector 220. The x-ray detector 220 resolves one or more x-ray photon energies from the detected secondary beam 225 and outputs a first measurement data comprising an electric signal for each x-ray energy component, indicative of properties of the target area of the wafer 120. The signal generally identifies the elemental characteristics such as elemental composition, elemental concentration, or the like of the excited secondary beam 225. The method then proceeds to step 506 where the first measurement data is sent to the controller 400 for further processing.

The method then proceeds to step 508 where the target area of the semiconductor wafer 120 is acted upon by the optical subsystem 300. The confocal optical microscope 310 illuminates the target area with an input beam 315 which is reflected to the target area through the optical microscope 320 and an image of the target area is scanned by confocal optical microscope 310. The scanned image represents a second measurement data and may be processed at step 510 by the controller 400 to obtain geometrical measurements such as volume, critical dimensions, depth, height etc. of the target area. In an embodiment of the present invention, the steps 504 and the step 508 of the method 500 can be executed parallelly and simultaneously within the same time frame.

Figure 6:
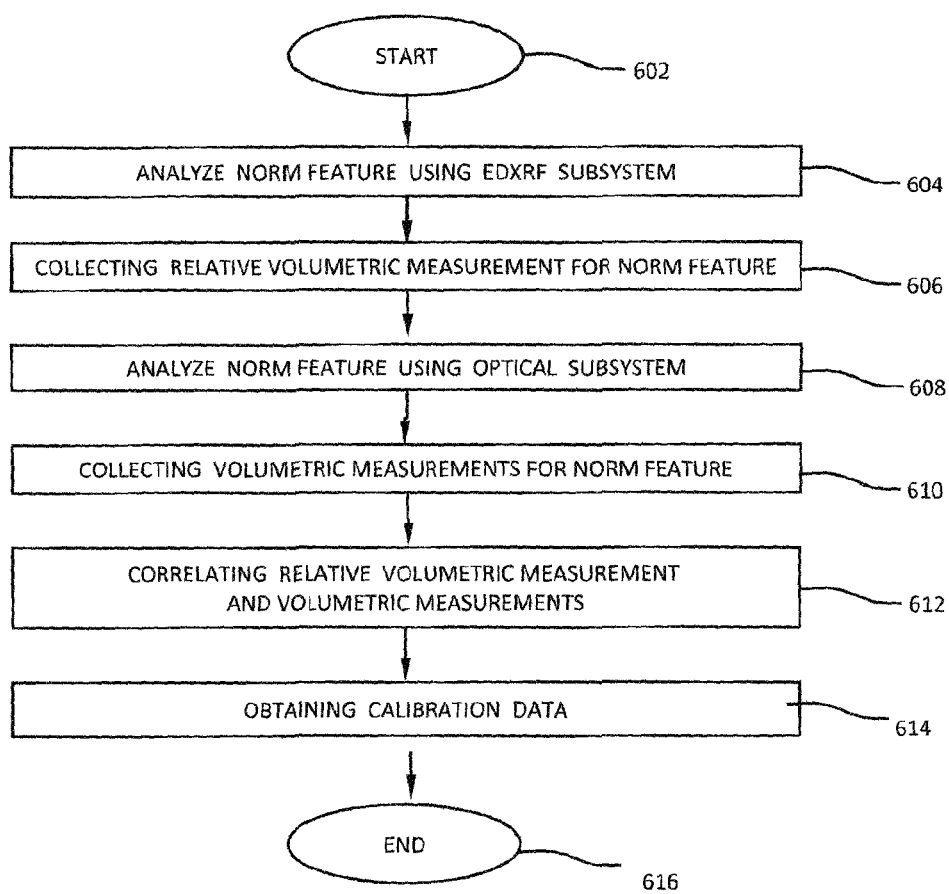
FIG. 6 is a flowchart illustrative of an exemplary method 600 for obtaining calibration data for a norm feature of the target area, according to an embodiment of the present disclosure.

At step 512, a calibration data for calibrating the first measurement data comprising elemental concentration, is obtained by a method 600 depicted in FIG. 6. The method 600 obtains the calibration data by analyzing the norm feature of the semiconductor wafer 120 using the subsystems 200 and 300 of the apparatus 100.

The method 600 starts at 602 and proceeds to step 604 where the first measurement data for the norm feature, comprising electric signal indicative of elemental components and concentration of the norm feature is obtained and sent to the controller 400. At step 606, the elemental concentration information for the norm features is converted into a relative volumetric information on the basis of elemental concentration information (photon count information), as well known in the art. Thereafter, at step 608, the norm feature is analyzed using optical subsystem 300 and a second measurement data comprising geometrical parameters of the norm feature is sent to the controller and volumetric information for the norm feature is calculated by the controller 400 using geometric parameters obtained from the optical subsystem 300 at step 610.

Thereafter, at step 612, the relative volumetric measurement obtained from the step 606 is correlated to the volumetric measurement obtained from the step 610 by using a statistically fitting method. The statistically fitting correlation method can be any correlation method, currently known in the art such as the Pearson correlation algorithm. The correlation plot is then used at step 614 to obtain an elemental contrast for the edxrf system 200 as a function of volumetric disparity between two subsystems 200 and 300. Such an elemental contrast is termed as calibration data. In some embodiments, the elemental contrast is obtained as a function of a geometric parameter such as height, depth, etc. For example, in an embodiment where the norm feature comprises pillars of varying height, volume disparity generally results due to difference in height and accordingly in such instances elemental contrast for varying height can be obtained using correlation algorithm. Such an elemental contrast is termed as calibration data.

The method 500 then proceeds to step 514 where calibration data obtained using method 600 is used to plot a graph between the elemental concentration measurement obtained for the target area of the semiconductor wafer 120 against the volumetric measurement calculated for the target area of the semiconductor wafer 120 using the optical subsystem 300. The plot is then used to obtain a calibrated elemental concentration for the target area at step 516. In an embodiment, calibration curve may also be generated using known calibration programs including but not limited to SUPERQ, an XRF analysis software from PANalytical of 12 Michigan Drive, Natic, Mass., United States of America.

It is to be understood that the steps of the method 500 and 600 have been described in a sequential order for the ease of the description; the steps of the methods 500 and 600 may be executed parallelly, sequentially or in any possible order while not deviating from the subject matter of the current disclosure.

While above embodiments have been illustrated for single target area, it is to be understood that the current invention may be implemented on more than one target area and process or technique may also be repeated for investigation and calibration of different target area such as different features, elements. Further, while the current method discloses calibration of a generally homogeneous semiconductor wafer, the method can be implemented on non-homogeneous surfaces using correction algorithm well known in the art.

INDUSTRIAL APPLICABILITY

The present disclosure relates to a metrology apparatus 100 for accurately measuring and calibrating an elemental concentration of a semiconductor wafer having different structures, shapes, size, thickness etc. The apparatus 100 could also be used for inspecting and detecting geometrical and compositional excursions within the semiconductor wafer by comparing the wafer using the two subsystems 200 and 300 of the apparatus 100.

Throughout the specifications of the present disclosure, the term "comprising" means including but not necessarily to the exclusion of other elements or steps. In other words, the term comprising indicates an open list. Furthermore, all directional references (such as, but not limited to, upper, lower, inner, outer, upward, downward, inwards, outwards, right, left, rightward, leftward, inside, outside, top, bottom, above, below, vertical, horizontal, clockwise, and counter=clockwise, lineal, axial and/or radial, or any other directional and/or similar references) are only used for identification purposes to aid the reader's understanding of illustrative embodiments of the present disclosure, and may not create any limitations, particularly as to the position, orientation, or use unless specifically set forth in the claims. Moreover, all directional references are approximate and should not be interpreted as exact, but rather as describing a general indicator as to an approximate attitude.

Similarly, joinder references (such as, but not limited to, attached, coupled, connected, accommodated, and the like and their derivatives) are to be construed broadly and may include intermediate members between a connection of segments and relative movement between segments. As such, joinder references may not necessarily infer that two segments are directly connected and in fixed relation to each other.

In some instances, components are described with reference to "ends" having a particular characteristic and/or being connected with another part. However, those skilled in the art will recognize that the present disclosure is not limited to components which terminate immediately beyond their points of connection with other parts. Thus, the term "end" should be interpreted broadly, in a manner that includes areas adjacent, rearward, forward of, or otherwise near the terminus of a particular segment, link, component, part, member or the like. Additionally, all numerical terms, such as, but not limited to, "second", "second", "third", "fourth", or any other ordinary and/or numerical terms, should also be taken only as identifiers, to assist the reader's understanding of the various embodiments, variations and/or modifications of the present disclosure, and may not create any limitations, particularly as to the order, or preference, of any embodiment, variation and/or modification relative to, or over, another embodiment, variation and/or modification.

As will be readily apparent to those skilled in the art, the present invention may easily be produced in other specific forms without departing from its essential characteristics. The present embodiments is, therefore, to be considered as merely illustrative and not restrictive, the scope of the invention being indicated by the claims rather than the foregoing description, and all changes which come within therefore intended to be embraced therein. Many variations, modifications, additions, and improvements are possible. More generally, embodiments in accordance with the present disclosure have been described in the context of preferred embodiments. Functionalities may be separated or combined in procedures differently in various embodiments of the disclosure or described with different terminology. These and other variations, modifications, additions, and improvements may fall within the scope of the disclosure as defined in the appended claims.

The invention claimed is:

1. A metrology apparatus for accurately measuring the elemental concentration of a semiconductor wafer, comprising:

an edXRF subsystem for the acquisition of elemental concentration information of a semiconductor wafer;

an optical microscopy subsystem for the acquisition of volumetric information of said semiconductor wafer;

a controller in communication with said edXRF subsystem and said optical microscopy subsystem, wherein said controller acquires information from both of said subsystems so as to accurately measure said elemental concentration of said semiconductor wafer;

wherein said ed XRF subsystem analyzes a norm feature of said semiconductor wafer so as to measure elemental concentration of said norm feature of said semiconductor wafer, and to collect volumetric values for said norm feature of said semiconductor wafer;

wherein said optical microscopy subsystem comprises a confocal optical microscopy subsystem for analyzing said norm feature of said semiconductor wafer and for collecting volumetric values for said norm feature of said semiconductor wafer;

wherein said volumetric values for said norm feature of said semiconductor wafer as collected by said edXRF subsystem are compared with said volumetric values for said norm feature of said semiconductor wafer as collected by said optical microscopy subsystem so as to calculate correlation data;

wherein said elemental concentration data of said norm feature of said semiconductor wafer, as determined by said edXRF subsystem, is compared to said correlation data so as to calculate calibration data for said edXRF subsystem; and wherein said calibration data for said norm feature of said semiconductor wafer is used to calibrate said measured elemental concentration data of said edXRF subsystem.

2. The apparatus of claim 1, further comprising:

a display screen in communication with said controller for displaying said elemental concentration of said semiconductor wafer as received from said ed XRF subsystem.

3. The apparatus of claim 1, wherein:

said controller converts said elemental concentration information received from said edXRF subsystem into relative volumetric data.

4. The apparatus of claim 3, wherein:

said controller correlates said relative volumetric data with said volumetric information received from said optical microscopy subsystem for said norm feature of said semiconductor wafer so as to obtain said calibration data.

5. The apparatus of claim 4, wherein:

said calibration data comprises an elemental contrast as a function of volumetric disparity between said edXRF subsystem and said optical microscopy subsystem.

6. The apparatus of claim 4, wherein:

said controller uses said obtained calibration data to calibrate said information acquired from said edXRF subsystem.

7. The apparatus of claim 1, further comprising:

an optical microscope unit configured to spot a target area of said semiconductor wafer.

8. A method for calibrating an edXRF measurement for analysis of elemental concentration information of a target area within a semiconductor wafer, comprising the steps of:

analyzing and collecting elemental concentration values for said target area of said semiconductor wafer using an edXRF subsystem;

analyzing and collecting volumetric measurement values for said target area of said semiconductor wafer using an optical microscopy subsystem;

obtaining calibration data for said edXRF subsystem using a method comprising the steps of:

analyzing a norm feature of said target area of said semiconductor wafer by an edXRF subsystem so as to measure elemental concentration of said norm feature of said semiconductor wafer;

collecting volumetric values for said norm feature of said target area of said semiconductor wafer as analyzed by said edXRF subsystem;

analyzing said norm feature of said target area of said semiconductor wafer by a confocal optical microscopy subsystem;

collecting volumetric values for said norm feature of said target area of said semiconductor wafer as analyzed by said optical microscopy subsystem;

calculating correlation data by comparing volumetric values for said norm feature of said target area of said semiconductor wafer as collected by using said edXRF subsystem with said volumetric values for said norm feature of said target area of said semiconductor wafer as collected by using said optical microscopy subsystem;

calculating calibration data for said edXRF subsystem by comparing said measured elemental concentration values for said norm feature of said target area of said semiconductor wafer by using said edXRF subsystem and said calculated correlation data; and calibrating said measured edXRF values for said norm feature of said target area of said semiconductor wafer using said calibration data for said norm feature of said target area of said semiconductor wafer.

9. The method of claim 8, wherein:

said calibration data comprises an element contrast as a function of volumetric disparity between said measurement values using said edXRF subsystem and said optical microscopy subsystem.

10. The method of claim 8, further comprising the step of:

calculating correlation data by generating a plot of said volumetric values for said norm feature of said target area of said semiconductor as collected by using said edXRF subsystem versus said volumetric values for said norm feature of said target area of said semiconductor wafer as collected by using said optical microscoipy subsystem.

11. The method of claim 10, wherein:

said plot is generated by a statistical fitting process.

12. The method of claim 8, wherein:

said calibrating of said measured edXRF values comprises generating a calibration table of said edXRF values collected using said edXRF subsystem versus said volumetric values using said optical microscopy subsystem.

13. The method of claim 12, wherein:

said plot comprises a correlation algorithm.

14. The method of claim 13, wherein:

said correlation algorithm used to generate said correlation plot is a Pearson correlation algorithm.

15. The method of claim 8, wherein:

said calibrating of said measured edXRF values comprises generating a plot of said edXRF values collected using said edXRF subsystem versus said volumetric values collected using said optical microscopy subsystem.

* * * * *